United States Patent
Hioki et al.

(10) Patent No.: US 11,277,253 B2
(45) Date of Patent: Mar. 15, 2022

(54) TIME SYNCHRONIZATION SYSTEM, MASTER DEVICE, SLAVE DEVICE, AND PROGRAM

(71) Applicant: Mitsubishi Electric Corporation, Tokyo (JP)

(72) Inventors: Eitaro Hioki, Aichi (JP); Naoya Uchiyama, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/429,352

(22) PCT Filed: Apr. 22, 2019

(86) PCT No.: PCT/JP2019/017084
§ 371 (c)(1),
(2) Date: Aug. 9, 2021

(87) PCT Pub. No.: WO2020/217286
PCT Pub. Date: Oct. 29, 2020

(65) Prior Publication Data
US 2022/0045836 A1    Feb. 10, 2022

(51) Int. Cl.
*H04L 7/00*      (2006.01)
*G06F 1/14*      (2006.01)

(52) U.S. Cl.
CPC ............. *H04L 7/0012* (2013.01); *G06F 1/14* (2013.01)

(58) Field of Classification Search
CPC . H04L 7/0012; H04L 7/04; G06F 1/14; G06F 1/08; H04J 3/0667; H04J 3/0638; H04J 3/0685; G01R 13/32
(Continued)

(56) References Cited

U.S. PATENT DOCUMENTS 5,717,704 A * 2/1998 Rosenfeld .............. G01R 13/32
                                                        714/712
2010/0177763 A1* 7/2010 Van Der Stok ....... H04J 3/0638
                                                        370/350
(Continued)

FOREIGN PATENT DOCUMENTS

JP        4-294413 A    10/1992
JP        5-134062 A     5/1993
(Continued)

OTHER PUBLICATIONS

International Search Report and Written Opinion dated May 28, 2019, received for PCT Application PCT/JP2019/017084, Filed on Apr. 22, 2019, 6 pages including English Translation.
(Continued)

*Primary Examiner* — Phuong Phu
(74) *Attorney, Agent, or Firm* — Xsensus LLP

(57) ABSTRACT

A time synchronization system includes a master and slave devices connected to each other via a data bus and a signal line dedicated to transmission of a fixed-period signal. The master device transmits the fixed-period signal through the signal line regularly at a transmission period, and transmits start time information indicating a transmission start time at which transmission of the fixed-period signal is started and transmission period information indicating the transmission period for the fixed-period signal through the data bus. The slave device counts a number of times the fixed-period signal is received and calculates, as a current time in the master device, a transmission time at which the master device transmits the fixed-period signal based on the number of times the fixed-period signal is received. The slave device corrects the time to the calculated current time in the master device.

20 Claims, 16 Drawing Sheets

(58) Field of Classification Search
USPC .......................... 375/356, 373, 371, 357, 358
See application file for complete search history.

(56) References Cited

U.S. PATENT DOCUMENTS

| | | | |
|---|---|---|---|
| 2015/0318977 A1* | 11/2015 | Gelter ................... | H04L 7/0012 |
| | | | 709/231 |
| 2017/0041688 A1* | 2/2017 | Pitigoi-Aron ......... | H04J 3/0685 |
| 2018/0004244 A1* | 1/2018 | Woodhead ............... | G06F 1/08 |
| 2018/0139709 A1* | 5/2018 | Shenoi .................. | H04J 3/0667 |
| 2018/0196465 A1* | 7/2018 | Sharpe-Geisler ......... | H04L 7/04 |

FOREIGN PATENT DOCUMENTS

| | | |
|---|---|---|
| JP | 11-203250 A | 7/1999 |
| JP | 5141972 B2 | 2/2013 |
| JP | 2018-112881 A | 7/2018 |

OTHER PUBLICATIONS

Notice of Reasons for Refusal dated Oct. 29, 2019, received for JP Application 2019-552645, 4 pages including English Translation.
Notice of Reasons for Refusal dated Jan. 14, 2020, received for JP Application 2019-552645, 4 pages including English Translation.
Decision to Grant dated Apr. 21, 2020, received for JP Application 2019-552645, 5 pages including English Translation.

* cited by examiner

TIME SYNCHRONIZATION SYSTEM, MASTER DEVICE, SLAVE DEVICE, AND PROGRAM

CROSS-REFERENCE TO RELATED APPLICATION

The present application is based on PCT filing PCT/JP2019/017084, filed Apr. 22, 2019, the entire contents of which are incorporated herein by reference.

TECHNICAL FIELD

The present disclosure relates to a time synchronization system, a master device, a slave device, and a program.

BACKGROUND ART

Techniques have been developed for synchronizing multiple devices associated with each other, such as programmable logic controllers (PLCs), each including, for example, a built-in clock. Such techniques use synchronization that typically involves determining a master device that manages reference time among multiple devices, and setting the time in slave devices, or devices other than the master device, to the time in the master device based on time information transmitted by the master device to the slave devices.

Patent Literature 1 describes a time setting technique. The technique involves forming a dedicated signal line between a station including a master clock and a station including a slave clock, transmitting, with the station including a master clock, a time synchronizing pulse signal through the dedicated signal line in predetermined periods, transmitting time information at a time point of transmitting the time synchronizing pulse signal through a network, and setting time with the station including a slave clock based on the time synchronizing pulse signal and the time information.

CITATION LIST

Patent Literature

Patent Literature 1: Unexamined Japanese Patent Application Publication No. H4-294413

SUMMARY OF INVENTION

Technical Problem

With the technique described in Patent Literature 1, every time when the station including a master clock transmits a time cycle pulse signal through the dedicated signal line, the station transmits time information at the time point of transmitting the time cycle pulse signal through a data communication line of a network. Thus, the time information is affected by jitter and propagation delay time caused in the data communication line, and reaches the station including a slave clock later than the time cycle pulse signal. When the maximum time lag caused by the propagation delay time and the jitter on the time information transmitted to the data communication line exceeds a period for transmitting a time cycle pulse signal, a new time cycle pulse signal may reach the station before the time information corresponding to the previous time cycle pulse signal. The period for transmitting a time cycle pulse signal fails to be further shortened than the maximum time lag of the data communication line. More specifically, the accuracy of synchronization is limited by the propagation delay time and the jitter caused in the data communication line.

An objective of the present disclosure is to achieve more accurate synchronization for setting the time in a slave device to the time in a master device.

Solution to Problem

To achieve the above objective, a time synchronization system according to an aspect of the present disclosure includes a master device and a slave device. The master device and the slave device are connected to each other via a data communication line and a signal line dedicated to transmission of a fixed-period signal. The master device includes a master timekeeper, a fixed-period signal transmitter, a start time transmitter, a transmission period storage, and a transmission period transmitter. The master timekeeper measures a time. The fixed-period signal transmitter, regularly at a transmission period, generates the fixed-period signal and transmits the fixed-period signal to the slave device through the signal line. The start time transmitter transmits, to the slave device through the data communication line, start time information indicating a transmission start time at which transmission of the fixed-period signal is started. The transmission period storage stores transmission period information indicating the transmission period for the fixed-period signal. The transmission period transmitter transmits, to the slave device through the data communication line, the transmission period information stored in the transmission period storage. The slave device includes a slave timekeeper, a fixed-period signal receiver, a start time receiver, a start time storage, a transmission period receiver, a transmission period storage, a counter, a time calculator, and a time corrector. The slave timekeeper measures a time. The fixed-period signal receiver receives the fixed-period signal from the master device through the signal line. The start time receiver receives the start time information from the master device through the data communication line. The start time storage stores the start time information received by the start time receiver. The transmission period receiver receives the transmission period information from the master device through the data communication line. The transmission period storage stores the transmission period information received by the transmission period receiver. The counter counts a number of times the fixed-period signal is received by the fixed-period signal receiver. The time calculator calculates, as a current time in the master device, a transmission time at which the master device transmits the fixed-period signal, based on the transmission start time indicated by the start time information, the transmission period indicated by the transmission period information, and the number of times the fixed-period signal is received. The time corrector corrects the time measured by the slave timekeeper to the current time in the master device calculated by the time calculator.

Advantageous Effects of Invention

In the present disclosure, in synchronization of setting the time in a slave device to the time in a master device, the master device transmits a fixed-period signal to the slave device through a dedicated signal line, and corrects the time in the slave device to the time in the master device based on the number of times the fixed-period signal is received, a transmission period, and a transmission start time. In this synchronization, every transmission of a fixed-period signal does not involve transmission of time information at the transmission time point through the data communication line. This structure can thus shorten a period for transmitting a fixed-period signal independently of the propagation delay time and jitter caused in the data communication line, and can achieve more accurate synchronization.

DESCRIPTION OF EMBODIMENTS

Figure 1:
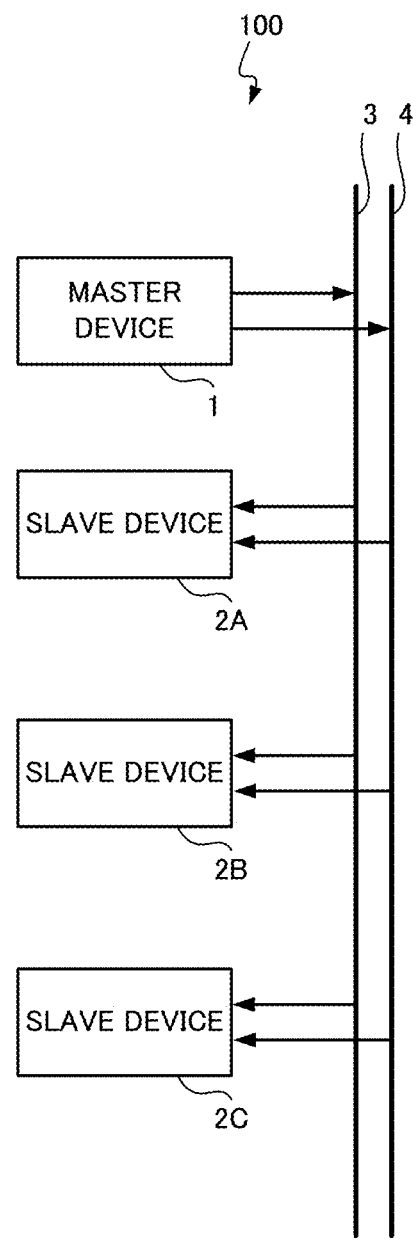
FIG. 1 is a block diagram of a time synchronization system according to Embodiment 1 of the present disclosure.

A time synchronization system, a master device, a slave device, and a program according to embodiments of the present disclosure are described below in detail with reference to the drawings. In the figures, the same or corresponding components are given the same reference numerals.

Embodiment 1

With reference to FIG. 1, a time synchronization system 100 according to Embodiment 1 includes a master device 1 and slave devices 2A to 2C connected via a signal line 3 and a data bus 4. The time synchronization system 100 synchronizes the time in the slave devices 2A to 2C to the time in the master device 1. The slave devices 2A to 2C are also collectively referred to as slave devices 2.

The master device 1 transmits a fixed-period signal regularly at a transmission period through the signal line 3. The signal line 3 is a communication line dedicated to transmission of fixed-period signals. The master device 1 transmits, through the data bus 4, start time information indicating a transmission start time at which transmission of the fixed-period signal is started, and transmission period information indicating a transmission period of the fixed-period signals.

The data bus 4 is a data communication line through which the master device 1 and the slave devices 2 transmit or receive data. The data bus 4 may be used for transmitting or receiving information other than the start time information and the transmission period information. The data bus 4 is an example of the data communication line. Each slave device 2 counts the number of times the fixed-period signal is received and calculates the current time of the master device 1 based on the number of times the fixed-period signal is received, the transmission start time indicated by the start time information, and the transmission period indicated by the transmission period information. Each slave device 2 corrects the time in the slave device 2 to the calculated current time in the master device 1.

FIG. 1 shows an example including three slave devices 2, but the system may include any other number of slave devices 2. Instead of a bus network, the network connecting the master device 1 and the slave devices 2A to 2C may be, for example, a star network.

Figure 2:
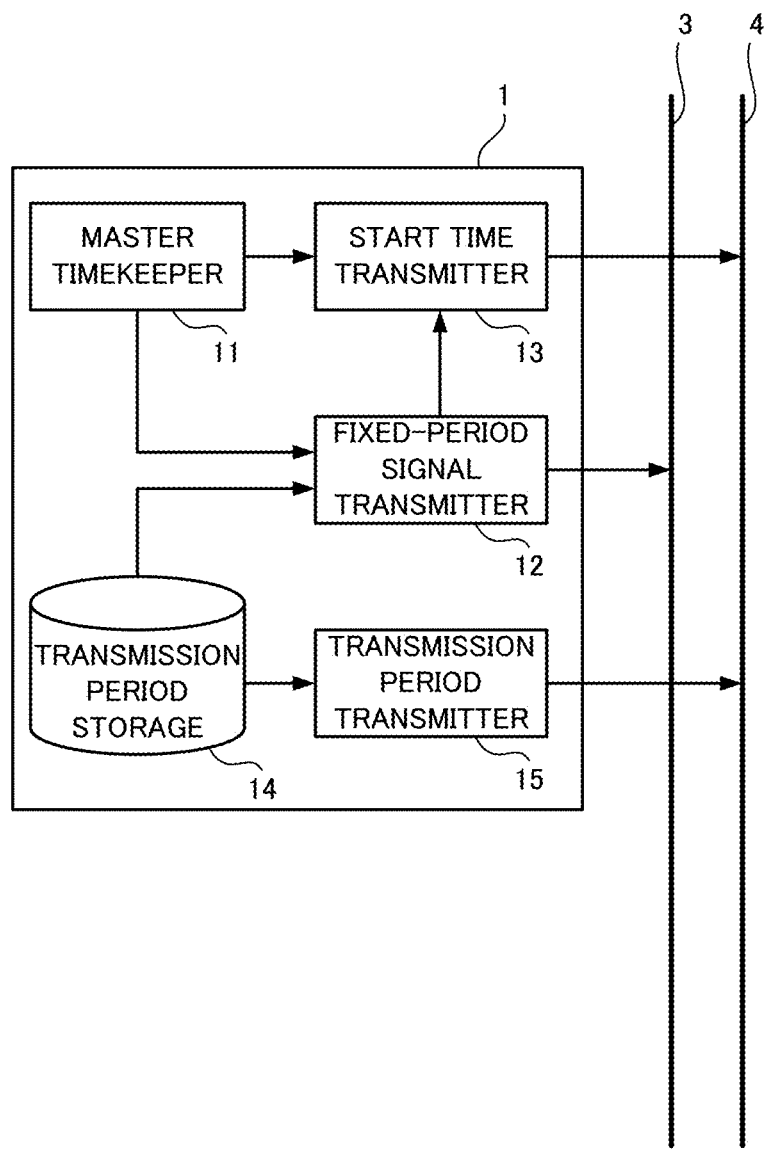
FIG. 2 is a functional block diagram of a master device according to Embodiment 1.

The functions of the master device 1 are described with reference to FIG. 2. As illustrated in FIG. 2, the master device 1 includes, as functional components, a master timekeeper 11 that measures a time, a fixed-period signal transmitter 12 that transmits fixed-period signals, a start time transmitter 13 that transmits start time information indicating the transmission start time at which transmission of the fixed-period signal is started, a transmission period storage 14 that stores transmission period information indicating a transmission period of the fixed-period signals, and a transmission period transmitter 15 that transmits the transmission period information. The time in the master device 1, or in other words, the time in the master timekeeper 11, is hereafter referred to as master time.

Based on the master time, the fixed-period signal transmitter 12 generates fixed-period signals in transmission periods indicated by the transmission period information stored in the transmission period storage 14 and transmits the fixed-period signals to the slave devices 2A to 2C through the signal line 3. The fixed-period signals are, for example, 1-bit pulse signals. Jitter and propagation delay time are sufficiently smaller for transmitting the fixed-period signals through the dedicated signal line 3 than for transmitting the fixed-period signals through the data bus 4. Thus, the transmission time at which the master device 1 transmits the fixed-period signals can be regarded as the same as the reception time at which the slave devices 2 receives the fixed-period signals.

The start time transmitter 13 performs a timestamping operation, or an operation of acquiring master time at which the fixed-period signal transmitter 12 starts transmitting the fixed-period signals. The start time transmitter 13 generates start time information indicating the master time at which transmission of the fixed-period signals is started, or indicating transmission start time. The start time transmitter 13 transmits start time information to the slave devices 2A to 2C through the data bus 4.

The transmission period transmitter 15 transmits transmission period information stored in the transmission period storage 14 to the slave devices 2A to 2C through the data bus 4. The transmission period transmitter 15 may transmit the transmission period information any time before the start time transmitter 13 transmits the start time information.

Figure 3:
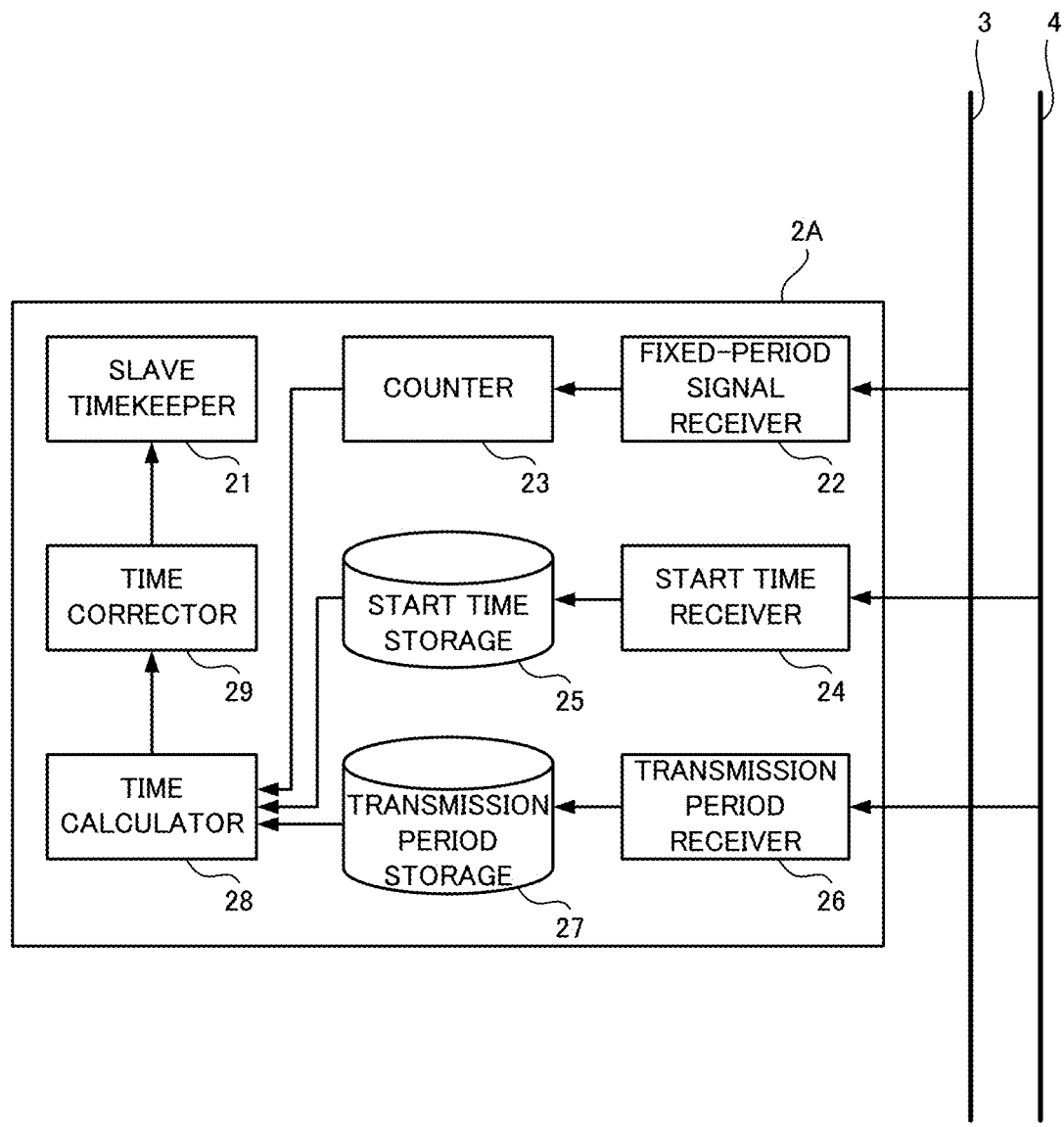
FIG. 3 is a functional block diagram of a slave device according to Embodiment 1.

The functions of each slave device 2 are described with reference to FIG. 3. FIG. 3 shows the functional components of the slave device 2A by way of example, but the slave devices 2B and 2C have the same functional components. As illustrated in FIG. 3, the slave device 2A includes, as functional components, a slave timekeeper 21 that measures a time, a fixed-period signal receiver 22 that receives fixed-period signals, a counter 23 that counts the number of times the fixed-period signal is received, a start time receiver 24 that receives start time information, a start time storage 25 that stores the start time information, a transmission period receiver 26 that receives transmission period information, a transmission period storage 27 that stores the transmission period information, a time calculator 28 that calculates current master time, and a time corrector 29 that corrects the time measured by the slave timekeeper 21.

The fixed-period signal receiver 22 receives fixed-period signals from the master device 1 through the signal line 3. The counter 23 counts the number of times the fixed-period signal receiver 22 receives the fixed-period signals and notifies the number of reception times to the time calculator 28. The start time receiver 24 receives the start time information from the master device 1 through the data bus 4. The start time storage 25 stores the start time information received by the start time receiver 24. The transmission period receiver 26 receives transmission period information from the master device 1 through the data bus 4. The transmission period storage 27 stores the transmission period information received by the transmission period receiver 26.

Every time when receiving a notification of the number of times the fixed-period signal is received from the counter 23, the time calculator 28 calculates, as the current master time, the transmission time at which the master device 1 transmits the fixed-period signals, based on the number of times the fixed-period signal is received that is indicated by the notification from the counter 23, the start time information stored in the start time storage 25, and the transmission period information stored in the transmission period storage 27. More specifically, the time calculator 28 calculates time obtained by adding, to the transmission start time indicated by the start time information, time obtained by multiplying the transmission period indicated by the transmission period information by a value obtained by subtracting 1 from the number of times the fixed-period signal is received, or calculates the transmission time at which the master device 1 transmits the fixed-period signals. As described above, the transmission time at which the master device 1 transmits the fixed-period signals can be regarded as the same as the reception time at which the slave device 2 receives the fixed-period signals. Thus, the time calculator 28 calculates, as the current master time, the transmission time at which the master device 1 transmits the fixed-period signals. The time corrector 29 corrects the time in the slave timekeeper 21 to the current master time calculated by the time calculator 28. The time in the slave device 2, or in other words, the time measured by the slave timekeeper 21, is hereafter referred to as slave time.

Figure 4:
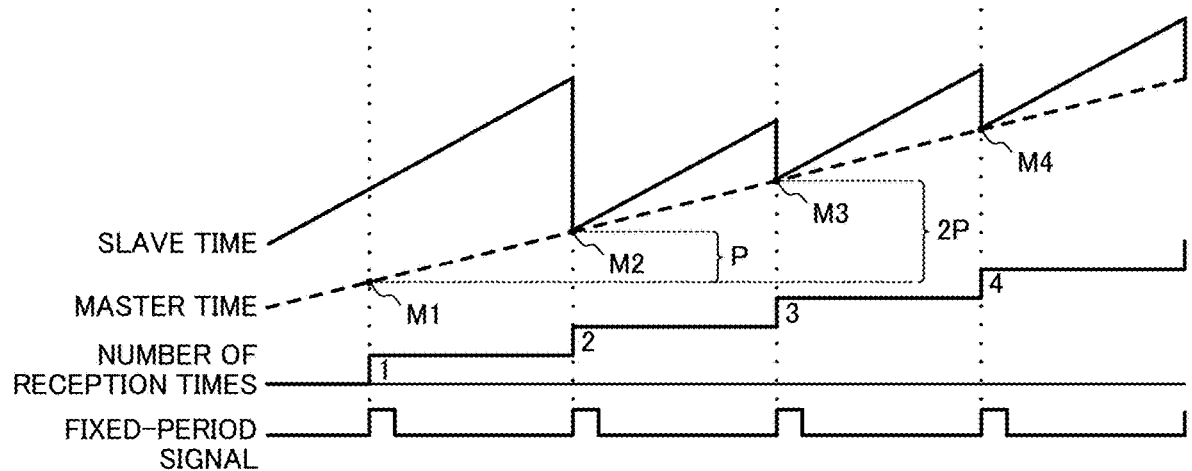
FIG. 4 is a diagram showing time correction according to Embodiment 1.

Time correction performed by the slave device 2 is described with reference to FIG. 4. As illustrated in FIG. 4, the fixed-period signal receiver 22 in the slave device 2 receives the fixed-period signals at regular time intervals. The time intervals at which the fixed-period signals are received correspond to transmission periods P for the master time. The counter 23 counts the number of times the fixed-period signal is received and notifies the number of times to the time calculator 28. The start time receiver 24 receives the transmission start time, or in other words, the start time information indicating master time M1, and stores the start time information into the start time storage 25. In the example illustrated in FIG. 4, the start time receiver 24 receives start time information between a first reception of a fixed-period signal and a second reception of a fixed-period signal. The transmission period receiver 26 receives transmission period information indicating the transmission period P before the start time receiver 24 receives the start time information and stores the transmission period information into the transmission period storage 27.

When receiving a notification of the count of 2 from the counter 23 as the number of times the fixed-period signal is received at the second reception of a fixed-period signal, the time calculator 28 calculates, as master time M2, time obtained by adding, to the master time M1 indicated by the start time information, time obtained by multiplying the transmission period P indicated by the transmission period information by 1, or a value obtained by subtracting 1 from 2 that is the number of times the fixed-period signal is received. When receiving a notification of the count of 3 from the counter 23 as the number of times the fixed-period signal is received at a third reception of a fixed-period signal, the time calculator 28 calculates, as master time M3, time obtained by adding, to the master time M1 indicated by the start time information, time obtained by multiplying the transmission period P indicated by the transmission period information by 2, or a value obtained by subtracting 1 from 3 that is the number of times the fixed-period signal is received. In this manner, every time when receiving a notification of the number of times the fixed-period signal is received from the counter 23, the time calculator 28 calculates current master time Mn with the formula (1) below with the master time M1 and the transmission period P, where n≥2.

$$Mn = M1 + P \times (n-1) \tag{1}$$

Every time when the time calculator 28 calculates the current master time Mn, the time corrector 29 corrects the slave time to the current master time Mn. Thus, the slave time is corrected to the current master time every time when each slave device 2 receives a fixed-period signal. In the example illustrated in FIG. 4, the start time information is received between the first reception of a fixed-period signal and the second reception of a fixed-period signal, and the time calculator 28 calculates the master time Mn later than the master time M2, but this is not limitative. The time calculator 28 may calculate the master time Mn any time after the start time receiver 24 receives the start time information and stores the start time information into the start time storage 25, and then the fixed-period signal receiver 22 receives a fixed-period signal.

Figure 5:
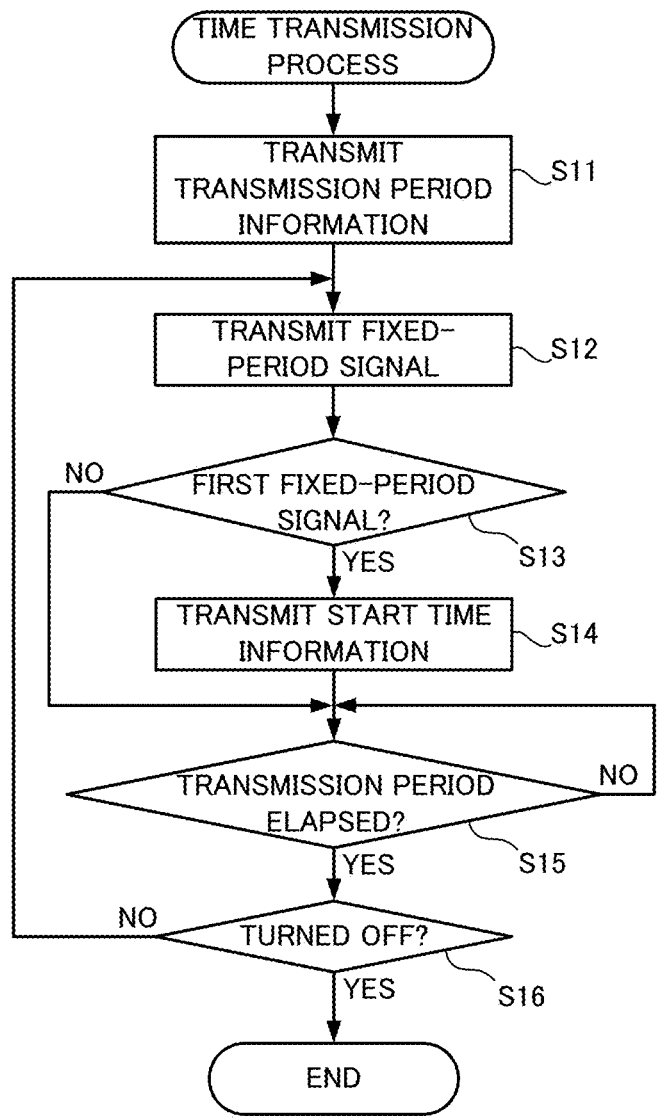
FIG. 5 is a flowchart showing a time transmission process according to Embodiment 1.

The time transmission process performed by the master device 1 is described with reference to FIG. 5. The time transmission process illustrated in FIG. 5 is started when the master device 1 is turned on. The transmission period transmitter 15 in the master device 1 transmits the transmission period information stored in the transmission period storage 14 to each slave device 2 through the data bus 4 (step S11). In the example illustrated in FIG. 4, the transmission period transmitter 15 transmits the transmission period information indicating the transmission period P to each slave device 2.

Referring back to FIG. 5, the fixed-period signal transmitter 12 generates fixed-period signals and transmits the fixed-period signals to the slave devices 2 through the signal line 3 (step S12). When the transmitted fixed-period signals are first fixed-period signals (YES in step S13), the start time transmitter 13 generates, based on the master time, start time information indicating transmission start time at which the fixed-period signal transmitter 12 starts transmitting the fixed-period signal, and transmits the start time information to the slave devices 2 through the data bus 4 (step S14). In the example illustrated in FIG. 4, the start time transmitter 13 transmits the start time information indicating the master time M1 to the slave devices 2.

Referring back to FIG. 5, when the transmitted fixed-period signal is not the first fixed-period signal (NO in step S13), the processing proceeds to step S15. The fixed-period signal transmitter 12 determines, based on the master time, whether the transmission period indicated by the transmission period information stored in the transmission period storage 14 has elapsed after the fixed-period signals are transmitted in step S12 (step S15). When the transmission period has not elapsed (NO in step S15), the fixed-period signal transmitter 12 repeats step S15 and waits until the transmission period elapses. When the transmission period has elapsed (YES in step S15), the processing returns to step S12 and repeats steps S12 to S16, unless the master device 1 is turned off (NO in step S16). Thus, the master device 1 transmits fixed-period signals to the slave devices 2 in the transmission periods indicated by the transmission period information stored in the transmission period storage 14. In the example illustrated in FIG. 4, the master device 1 transmits fixed-period signals to the slave devices 2 in the transmission period P.

Referring back to FIG. 5, when the master device 1 is turned off (YES in step S16), the process ends.

Figure 6:
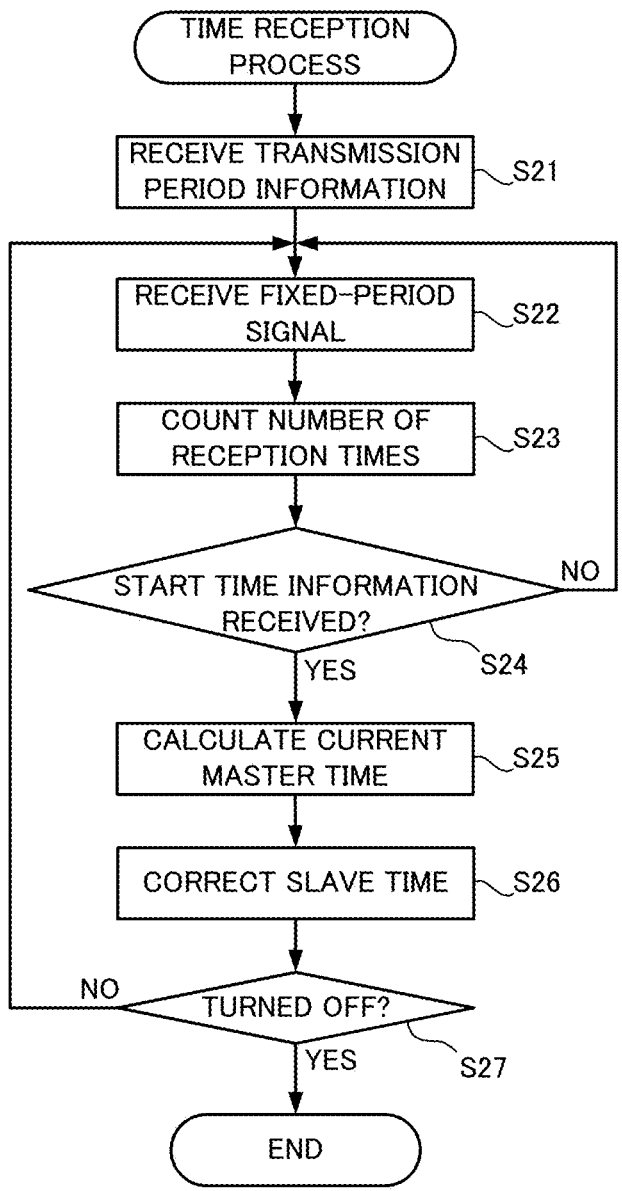
FIG. 6 is a flowchart showing a time reception process according to Embodiment 1.

A time reception process performed by each slave device 2 is described with reference to FIG. 6. The time reception process illustrated in FIG. 6 is started when each slave device 2 is turned on. The transmission period receiver 26 in each slave device 2 receives transmission period information from the master device 1 through the data bus 4 (step S21). The transmission period storage 27 stores the transmission period information received by the transmission period receiver 26. In the example illustrated in FIG. 4, the transmission period receiver 26 receives the transmission period information indicating the transmission period P from the master device 1. The transmission period storage 27 stores the transmission period information indicating the transmission period P.

Referring back to FIG. 6, the fixed-period signal receiver 22 receives fixed-period signals from the master device 1 through the signal line 3 (step S22). The counter 23 counts the number of times the fixed-period signal receiver 22 receives the fixed-period signals (step S23) and notifies the number of reception times to the time calculator 28. The start time receiver 24 determines whether the start time receiver 24 has received the start time information from the master device 1 through the data bus 4 (step S24). When the start time receiver 24 has not received the start time information (NO in step S24), the processing returns to step S22 and repeats steps S22 to S24, and the start time receiver 24 waits until start time information is received. When the start time receiver 24 has received the start time information (YES in step S24), the start time storage 25 has stored the start time information received by the start time receiver 24. In the example illustrated in FIG. 4, the start time storage 25 has stored the start time information indicating the master time M1 received by the start time receiver 24.

Referring back to FIG. 6, the time calculator 28 calculates current master time based on the number of times the fixed-period signal is received that is indicated by the notification from the counter 23, the start time information stored in the start time storage 25, and the transmission period information stored in the transmission period storage 27 (step S25). In the example illustrated in FIG. 4, the time calculator 28 calculates the current master time Mn with the above formula (1).

Referring back to FIG. 6, the time corrector 29 corrects the slave time to the current master time calculated in step S25 (step S26). Unless the slave device 2 is turned off (NO in step S27), the processing returns to step S22 and repeats steps S22 to S27. Thus, the slave time is corrected to the current master time every time when the slave device 2 receives a fixed-period signal. When the slave device 2 is turned off (YES in step S27), the process ends.

As described above, in the time synchronization system 100 according to Embodiment 1 that performs synchronization to set the time in each slave device 2 to the time in the master device 1, the master device 1 transmits fixed-period signals to the slave devices 2 through the dedicated signal line 3, and corrects the time in the slave devices 2 to the time in the master device 1 based on the number of reception times, the transmission period, and the transmission start time of fixed-period signals. Every transmission of a fixed-period signal does not involve transmission of time information at the transmission time point through the data bus 4. Thus, a period in which a fixed-period signal is transmitted can be shortened independently of jitter and propagation delay time caused in the data bus 4, and thus more accurate synchronization can be achieved. The start time information and the transmission period information are transmitted through the data bus 4 once. Thus, the bandwidth of the data bus 4 consumed in synchronization can be reduced compared with when time information at the transmission time point is transmitted through the data bus 4 for every transmission of a fixed-period signal.

Embodiment 2

In Embodiment 2, the transmission start time at which transmission of fixed-period signal is started is determined in advance. The structure of a time synchronization system 100 according to Embodiment 2 and the functional components of each slave device 2 are the same as those in Embodiment 1.

Figure 7:
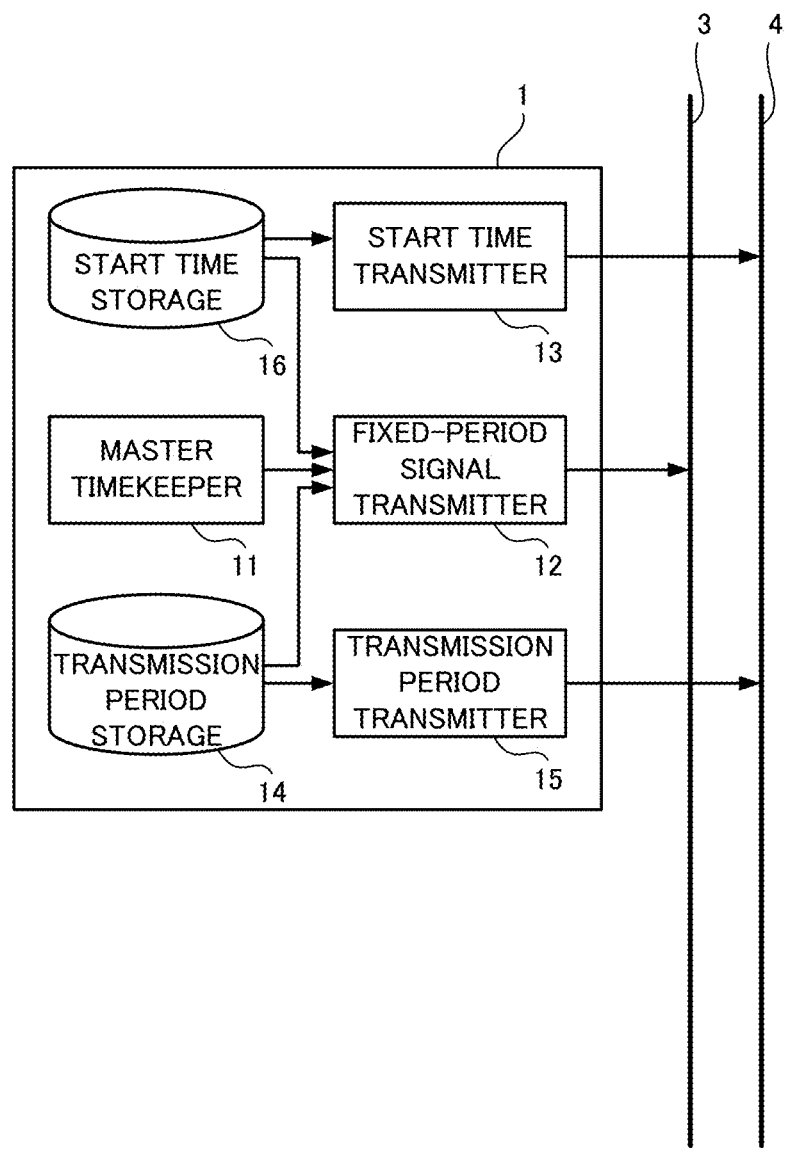
FIG. 7 is a functional block diagram of a master device according to Embodiment 2 of the present disclosure.

The functions of a master device 1 according to Embodiment 2 are described with reference to FIG. 7. As illustrated in FIG. 7, the master device 1 includes, as functional components, a start time storage 16, in addition to a master timekeeper 11, a fixed-period signal transmitter 12, a start time transmitter 13, a transmission period storage 14, and a transmission period transmitter 15.

The start time storage 16 stores start time information indicating a predetermined transmission start time. The fixed-period signal transmitter 12 starts transmitting the fixed-period signals when the master time reaches the transmission start time indicated by the start time information stored in the start time storage 16. The start time transmitter 13 transmits the start time information stored in the start time storage 16 to slave devices 2A to 2C through the data bus 4. The start time transmitter 13 may transmit the start time information any time before the fixed-period signal transmitter 12 starts transmitting the fixed-period signals. The other functions of the master device 1 are the same as those of the master device 1 according to Embodiment 1.

Figure 8:
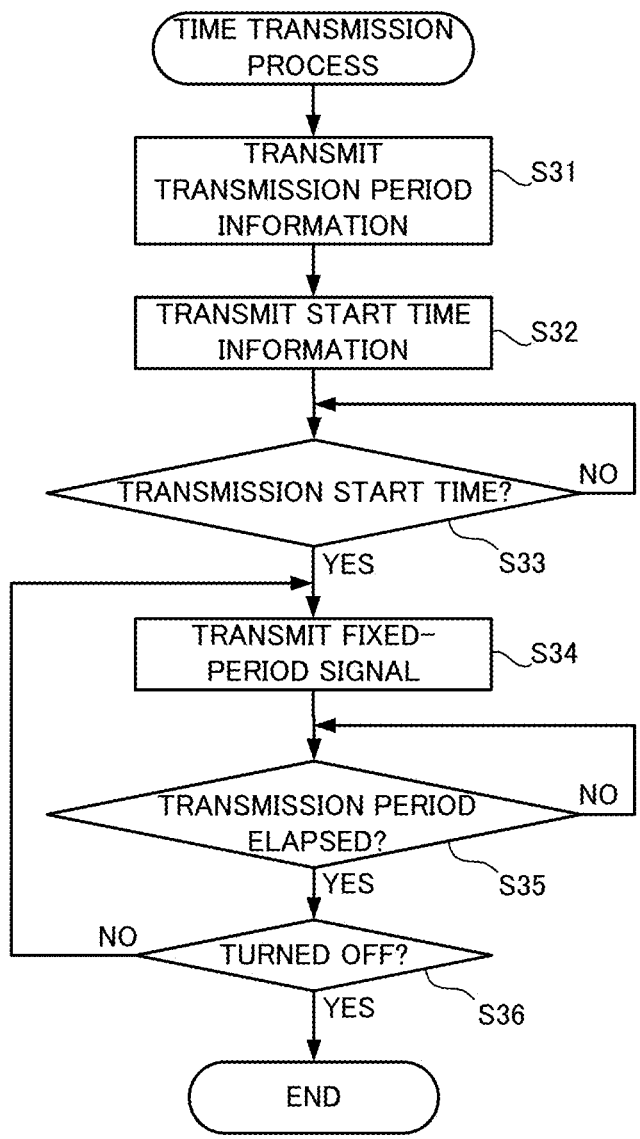
FIG. 8 is a flowchart showing a time transmission process according to Embodiment 2.

The time transmission process performed by the master device 1 is described with reference to FIG. 8. The time transmission process illustrated in FIG. 8 is started when the master device 1 is turned on. The transmission period transmitter 15 in the master device 1 transmits the transmission period information stored in the transmission period storage 14 to the slave devices 2 through the data bus 4 (step S31). The start time transmitter 13 transmits the start time information stored in the start time storage 16 to the slave devices 2 through the data bus 4 (step S32).

The fixed-period signal transmitter 12 determines whether the master time reaches the transmission start time indicated by the start time information stored in the start time storage 16 (step S33). Unless the master time reaches the transmission start time (NO in step S33), the fixed-period signal transmitter 12 repeats step S33 and waits until the master time reaches the transmission start time. When the master time reaches the transmission start time (YES in step S33), the fixed-period signal transmitter 12 generates fixed-period signals and transmits the fixed-period signals to the slave devices 2 through the signal line 3 (step S34).

The fixed-period signal transmitter 12 determines, based on the master time, whether the transmission period indicated by the transmission period information stored in the transmission period storage 14 has elapsed after transmitting the fixed-period signals (step S35). When the transmission period has not elapsed (NO in step S35), the fixed-period signal transmitter 12 repeats step S35 and waits until the transmission period elapses. When the transmission period has elapsed (YES in step S35), the processing returns to step S34 and repeats steps S34 to S36, unless the master device 1 is turned off (NO in step S36). When the master device 1 is turned off (YES in step S36), the process ends.

Figure 9:
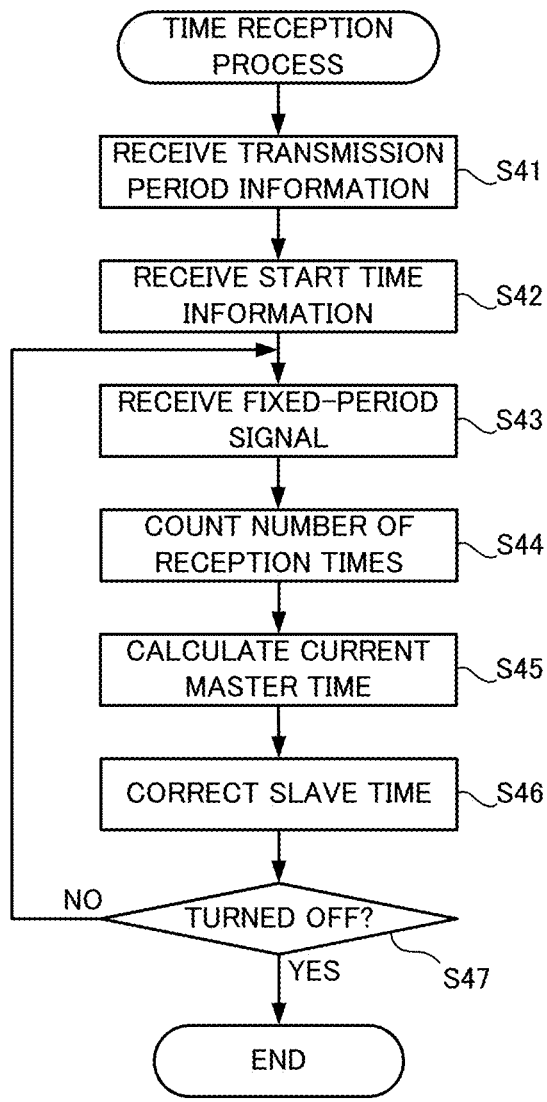
FIG. 9 is a flowchart showing a time reception process according to Embodiment 2.

A time reception process performed by each slave device 2 is described with reference to FIG. 9. The time reception process illustrated in FIG. 9 is started when the slave device 2 is turned on. The transmission period receiver 26 in each slave device 2 receives transmission period information from the master device 1 through the data bus 4 (step S41). The transmission period storage 27 stores the transmission period information received by the transmission period receiver 26. The start time receiver 24 receives the start time information from the master device 1 through the data bus 4 (step S42). The start time storage 25 stores the start time information received by the start time receiver 24.

The fixed-period signal receiver 22 receives a fixed-period signal from the master device 1 through the signal line 3 (step S43). The counter 23 counts the number of times the fixed-period signal receiver 22 receives the fixed-period signals (step S44) and notifies the number of reception times to the time calculator 28. The time calculator 28 calculates the current master time based on the number of times the fixed-period signal is received that is indicated by the notification from the counter 23, the start time information stored in the start time storage 25, and the transmission period information stored in the transmission period storage 27 (step S45).

The time corrector 29 corrects the slave time to the current master time calculated in step S45 (step S46). Unless the slave device 2 is turned off (NO in step S47), the processing returns to step S43 and repeats steps S43 to S47. Thus, the slave time is corrected to the master time every time when the slave device 2 receives a fixed-period signal. In Embodiment 2, each slave device 2 receives start time information before receiving a fixed-period signal. Thus, the slave time can be corrected to the current master time from the first reception of a fixed-period signal. When the slave device 2 is turned off (YES in step S47), the process ends.

As described above, in the time synchronization system 100 according to Embodiment 2 that performs synchronization to set the time in each slave device 2 to the time in the master device 1, the master device 1 transmits fixed-period signals to the slave devices 2 through the dedicated signal line 3 and corrects the time in the slave devices 2 to the time in the master device 1 based on the number of reception times, the transmission period, and the transmission start time of fixed-period signals. Every transmission of a fixed-period signal does not involve transmission of time information at the transmission time point through the data bus 4. Thus, a period in which a fixed-period signal is transmitted can be shortened independently of jitter and propagation delay time caused in the data bus 4, and thus more accurate synchronization can be achieved. The start time storage 16 stores the start time information in advance, and the start time transmitter 13 does not involve any timestamping operation unlike in Embodiment 1. The accuracy of synchronization is left unaffected by the accuracy of the timestamping operation.

Embodiment 3

In Embodiment 3, a slave device 2 performs time correction at time correction timing during the transmission period. The structure of a time synchronization system 100 according to Embodiment 3 and the functional components of a master device 1 are the same as those in Embodiment 2.

Figure 10:
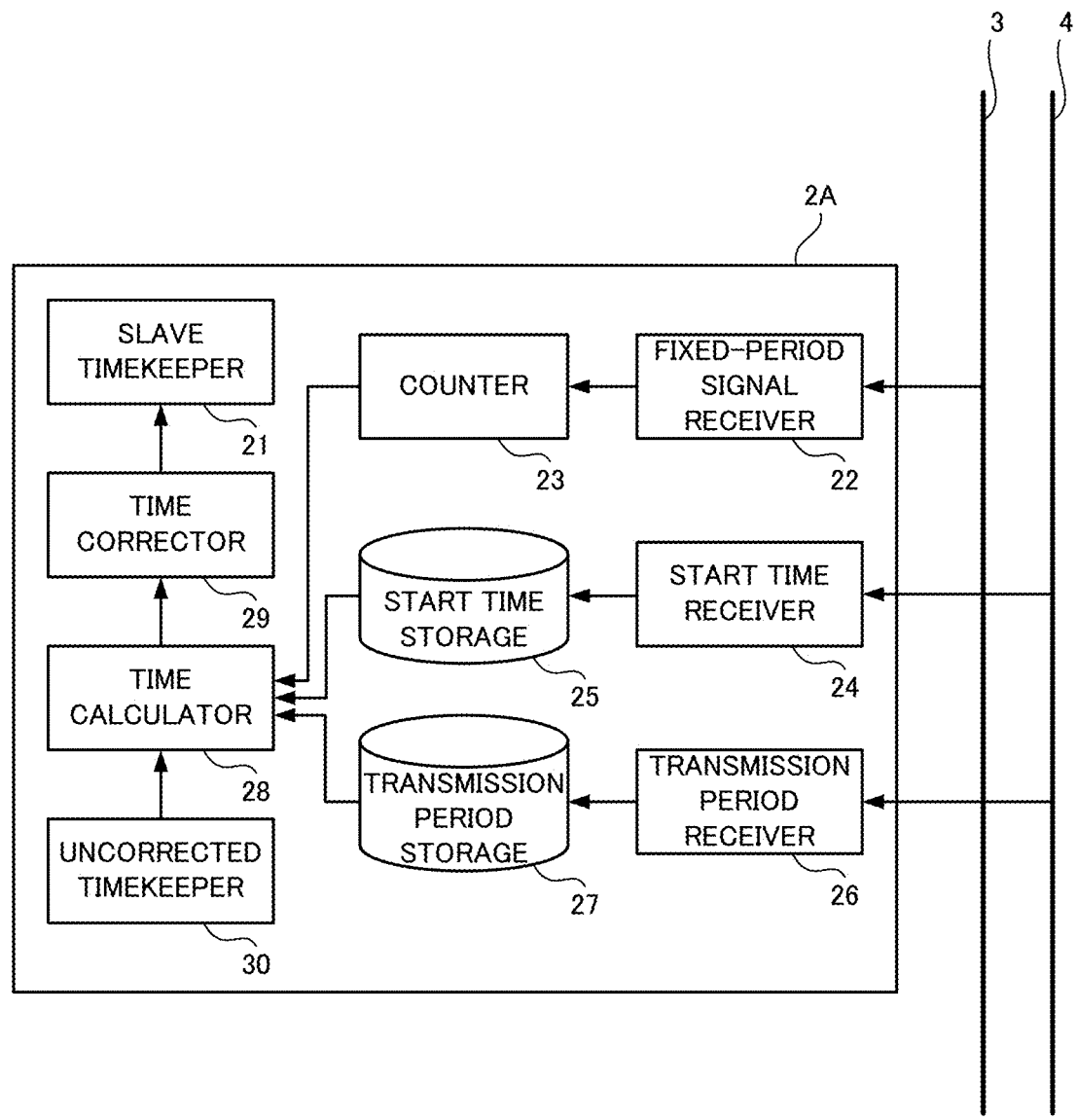
FIG. 10 is a functional block diagram of a slave device according to Embodiment 3 of the present disclosure.

The functions of the slave device 2 according to Embodiment 3 are described with reference to FIG. 10. FIG. 10 shows the functional components of a slave device 2A by way of example, but slave devices 2B and 2C have the same functional components. As illustrated in FIG. 10, the slave device 2A includes, as functional components, an uncorrected timekeeper 30 in addition to a slave timekeeper 21, a fixed-period signal receiver 22, a counter 23, a start time receiver 24, a start time storage 25, a transmission period receiver 26, a transmission period storage 27, a time calculator 28, and a time corrector 29.

The uncorrected timekeeper 30 measure a time that is equal to the time in the slave timekeeper 21, for which no time correction is performed by the time corrector 29. The time in the slave device 2 without being corrected, or the time measured by the uncorrected timekeeper 30, is hereafter referred to as uncorrected slave time.

Every time when receiving a notification of the number of times the fixed-period signal is received from the counter 23, the time calculator 28 calculates transmission time at which the master device 1 transmits the fixed-period signals, based on the number of times the fixed-period signal is received that is indicated by the notification from the counter 23, the start time information stored in the start time storage 25, and the transmission period information stored in the transmission period storage 27. More specifically, the time calculator 28 calculates time obtained by adding, to the transmission start time indicated by the start time information, time obtained by multiplying the transmission period indicated by the transmission period information by a value obtained by subtracting 1 from the number of times the fixed-period signal is received, as the transmission time at which the master device 1 transmits the fixed-period signals.

The time calculator 28 calculates current master time at the time correction timing during the transmission period based on the transmission time at which the master device 1 transmits the fixed-period signals, the time measured by the uncorrected timekeeper 30 at which the fixed-period signal receiver 22 receives the fixed-period signals, and the current time measured by the uncorrected timekeeper 30. More specifically, the time calculator 28 calculates, as the current master time, time obtained by adding, to the transmission time at which the master device 1 transmits the fixed-period signals calculated at reception timing of the last fixed-period signal, time in the master time elapsed from the reception timing of the last fixed-period signal to the current time. The time calculator 28 calculates the time in the master time elapsed from the reception timing of the last fixed-period signal to the current time by multiplying the elapsed time of the uncorrected slave time elapsed from the reception timing of the last fixed-period signal to the current time by a ratio of the advancement of the master time to the advancement of the uncorrected slave time. The time corrector 29 corrects the time measured by the slave timekeeper 21 to the current master time calculated by the time calculator 28.

Figure 11:
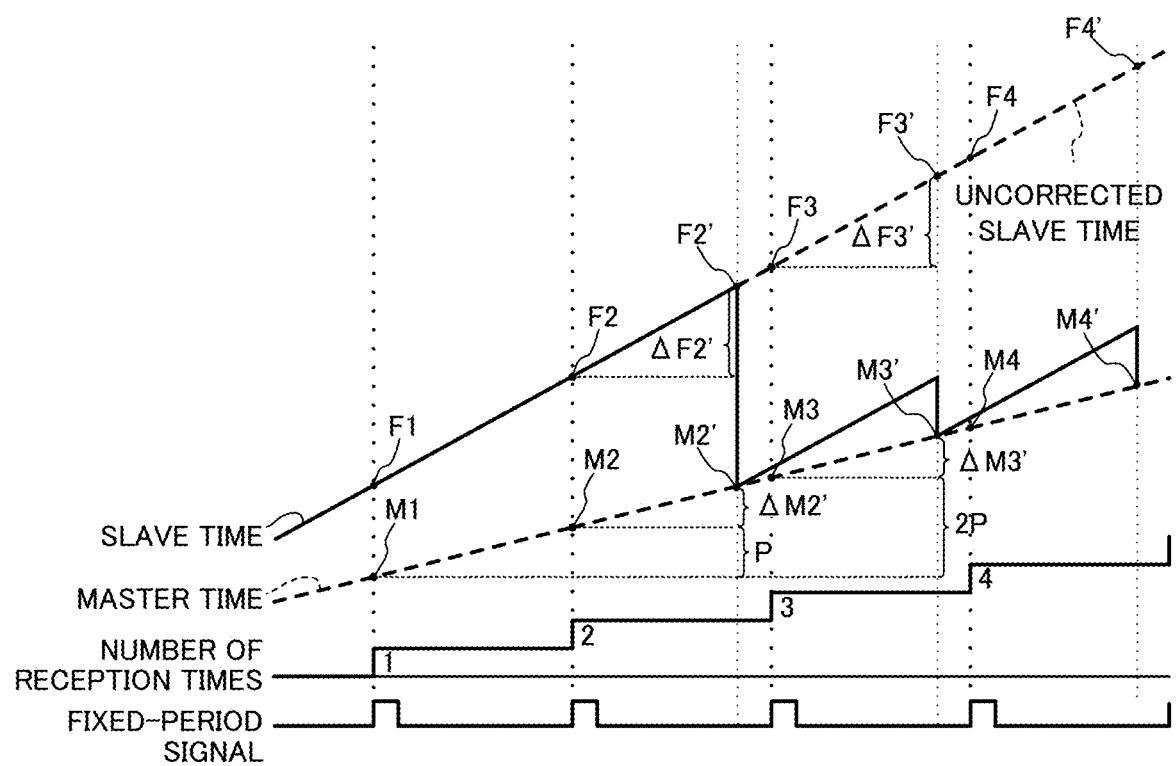
FIG. 11 is a diagram showing time correction according to Embodiment 3.

Time correction performed by each slave device 2 is described with reference to FIG. 11. As illustrated in FIG. 11, the fixed-period signal receiver 22 in the slave device 2 receives fixed-period signals at regular time intervals. The time intervals at which the fixed-period signals are received correspond to transmission periods P for the master time. The counter 23 counts the number of times the fixed-period signal is received and notifies the number of times to the time calculator 28. The start time receiver 24 receives transmission start time, or the start time information indicating the master time M1 before the master time M1, and stores the start time information into the start time storage 25. The transmission period receiver 26 receives the transmission period information indicating the transmission period P before the master time M1 and stores the transmission period information into the transmission period storage 27.

Every time when receiving a notification of the number of times the fixed-period signal is received from the counter 23, the time calculator 28 calculates master time Mn with the above formula (1). When reaching the time correction timing during the transmission period, the time calculator 28 adds, to the master time Mn, elapsed time ΔMn' of the master time elapsed from the reception timing of the last fixed-period signal to the current time to calculate the current master time Mn' of the current master time. The time calculator 28 calculates the elapsed time ΔMn' of the master time elapsed from the reception timing of the last fixed-period signal to the current time with formula (2) below, using elapsed time ΔFn' of the uncorrected slave time elapsed from the reception timing of the last fixed-period signal to the current time and a ratio of the advancement of the master time to the advancement of the uncorrected slave time (Mn−M(n−1)/(Fn−F(n−1)), where n≥2.

$$\Delta Mn' = \Delta Fn' \times (Mn - M(n-1))/(Fn - F(n-1)) \qquad (2)$$

Instead of Mn−M(n−1), the transmission period P indicated by the transmission period information may be used. Every time when the time calculator 28 calculates the current master time Mn', the time corrector 29 corrects the slave time to the current master time Mn'. Thus, the slave time is corrected to the current master time at the time correction timing during the transmission periods. The time correction timing during the transmission period may be determined by a user or by the processing capacity of each slave device 2.

Figure 12:
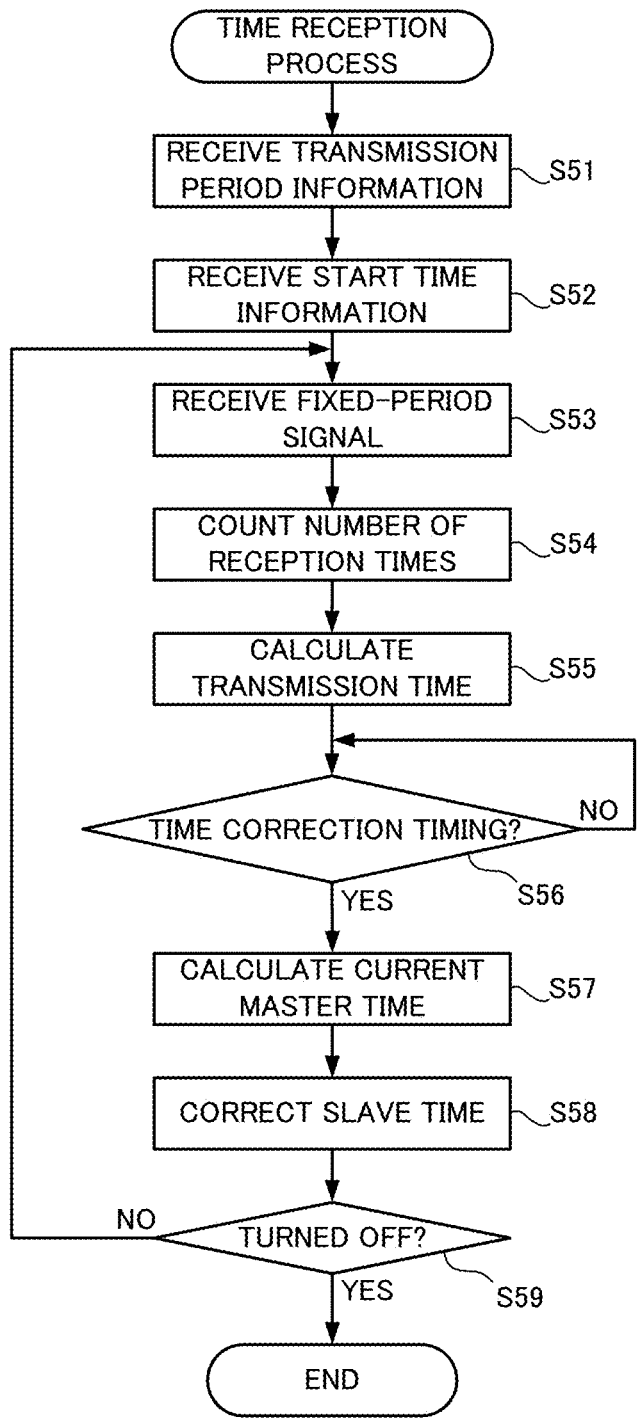
FIG. 12 is a flowchart showing a time reception process according to Embodiment 3.

The time reception process performed by each slave device 2 is described with reference to FIG. 12. The time reception process illustrated in FIG. 12 is started when the slave device 2 is turned on. Steps S51 to S54 are the same as steps S41 to S44 in the flowchart illustrated in FIG. 9 and are not described. The time calculator 28 in the slave device 2 calculates the transmission time at which the master device 1 transmits the fixed-period signals, based on the number of times the fixed-period signal is received that is indicated by the notification from the counter 23, the start time information stored in the start time storage 25, and the transmission period information stored in the transmission period storage 27 (step S55). In the example illustrated in FIG. 11, the time calculator 28 calculates the transmission time Mn at which the master device 1 transmits fixed-period signals with the above formula (1).

Referring back to FIG. 12, the time calculator 28 determines whether the time correction timing has come (step S56). When the time correction timing has not come (NO in step S56), the time calculator 28 repeats the step S56 to wait the time correction timing. When the time correction timing has come (YES in step S56), the time calculator 28 calculates the current master time based on the transmission time at which the master device 1 transmits the fixed-period signals, the time measured by the uncorrected timekeeper 30 at which the fixed-period signal receiver 22 receives the fixed-period signals, and the current time measured by the uncorrected timekeeper 30 (step S57). In the example illustrated in FIG. 11, the time calculator 28 calculates the current master time Mn' by adding, to the master time Mn, elapsed time ΔMn' of the master time elapsed from the reception timing of the last fixed-period signal to the current time. The time calculator 28 calculates the elapsed time ΔMn' of the master time elapsed from the reception timing of the last fixed-period signal to the current time with the above formula (2).

Referring back to FIG. 12, the time corrector 29 corrects the slave time to the master time calculated in step S57 (step S58). Unless the slave device 2 is turned off (NO in step S59), the processing returns to step S53 and repeats steps S53 to S59. Thus, the slave time is corrected to the master time at the time correction timing during transmission period. When the slave device 2 is turned off (YES in step S59), the process ends.

As described above, in the time synchronization system 100 according to Embodiment 3 that performs synchronization to set the time in each slave device 2 to the time in the master device 1, the master device 1 transmits fixed-period signals to the slave devices 2 through the dedicated signal line 3 and corrects the time in the slave devices 2 to the time in the master device 1 based on the number of reception times, the transmission period, and the transmission start time of fixed-period signals. Every transmission of a fixed-period signal does not involve transmission of time information at the transmission time point through the data bus 4. Thus, a period in which a fixed-period signal is transmitted can be shortened independently of jitter and propagation delay time caused in the data bus 4, and thus more accurate synchronization can be achieved. In addition, the slave time can be corrected to the master time at the time correction timing during the transmission period. Reception of the fixed-period signals does not involve instantaneous correction of the slave time to the master time. This structure can thus retain the accuracy also when the processing of correcting the slave time to the master time is implemented by software.

Embodiment 4

In Embodiment 4, the advancement of the slave time is corrected to match the advancement of the master time. The structure of a time synchronization system 100 according to Embodiment 4 and the functional components of a master device 1 are the same as those in Embodiment 2.

Figure 13:
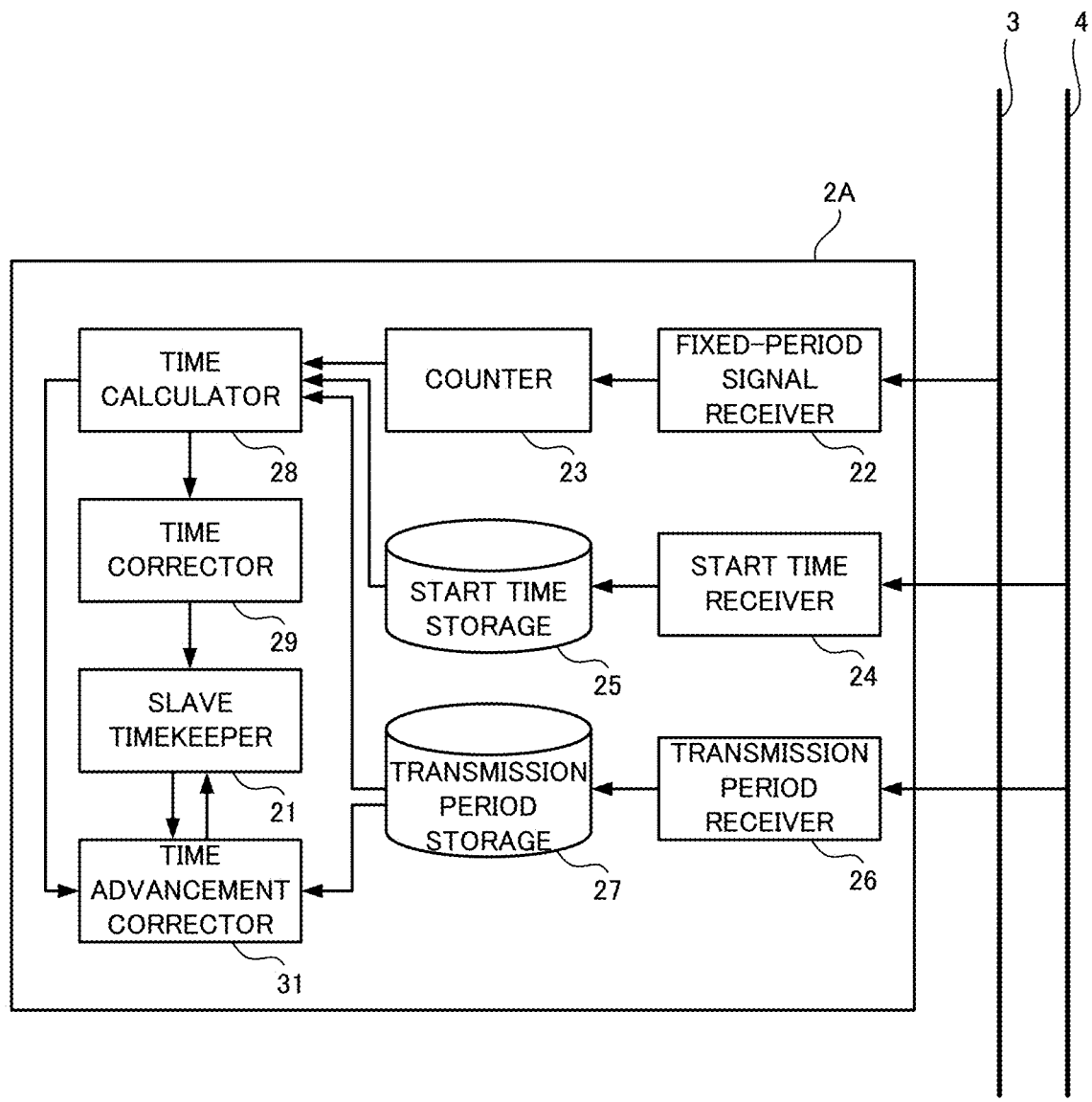
FIG. 13 is a functional block diagram of a slave device according to Embodiment 4 of the present disclosure.

The functions of a slave device 2 according to Embodiment 4 are described with reference to FIG. 13. FIG. 13 shows the functional components of a slave device 2A by way of example, but slave devices 2B and 2C have the same functional components. As illustrated in FIG. 13, the slave device 2A includes, as functional components, a time advancement corrector 31 that performs correction for matching the advancement of the slave time with the advancement of the master time, in addition to a slave timekeeper 21, a fixed-period signal receiver 22, a counter 23, a start time receiver 24, a start time storage 25, a transmission period receiver 26, a transmission period storage 27, a time calculator 28, and a time corrector 29.

Every time when receiving a notification of the number of times the fixed-period signal is received from the counter 23, the time calculator 28 calculates the current master time based on the number of times the fixed-period signal is received that is indicated by the notification from the counter 23, the start time information stored in the start time storage 25, and the transmission period information stored in the transmission period storage 27. More specifically, the time calculator 28 calculates the time obtained by adding, to the transmission start time indicated by the start time information, time obtained by multiplying the transmission period indicated by the transmission period information by a value obtained by subtracting 1 from the number of times the fixed-period signal is received, or calculates the transmission time at which the master device 1 transmits the fixed-period signals as the current master time.

The time advancement corrector 31 calculates the advancement of the master time and the advancement of the slave time every time when the fixed-period signal receiver 22 receives a fixed-period signal, based on the transmission time at which the master device 1 transmits the fixed-period signals and the time measured by the slave timekeeper 21 at which the fixed-period signal receiver 22 receives the fixed-period signal. The time advancement corrector 31 corrects the time in the slave timekeeper 21 by matching the advancement of the slave time with the advancement of the master time.

Figure 14:
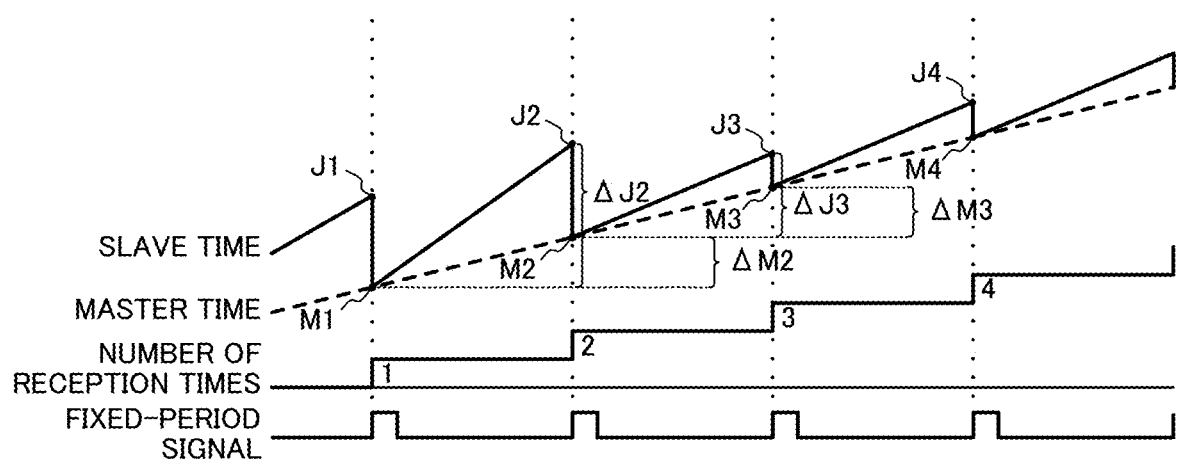
FIG. 14 is a diagram showing time correction according to Embodiment 4.

Time advancement correction performed by each slave device 2 is described with reference to FIG. 14. As illustrated in FIG. 14, the fixed-period signal receiver 22 in the slave device 2 receives fixed-period signals at regular time intervals. The time intervals at which the fixed-period signals are received correspond transmission periods P for the master time. The counter 23 counts the number of times the fixed-period signal is received and notifies the number of reception times to the time calculator 28. The start time receiver 24 receives transmission start time, or the start time information indicating the master time M1 before the master time M1, and stores the start time information into the start time storage 25. The transmission period receiver 26 receives the transmission period information indicating the transmission period P before the master time M1 and stores the transmission period information into the transmission period storage 27.

Every time when receiving a notification of the number of times the fixed-period signal is received from the counter 23, the time calculator 28 calculates the master time Mn with the above formula (1). The time corrector 29 corrects the slave time to the current master time Mn every time when the time calculator 28 calculates the current master time Mn. The time advancement corrector 31 calculates an advancement $\Delta Mn$ of the master time and an advancement $\Delta Jn$ of the slave time every time when the time calculator 28 calculates the master time Mn. The advancement $\Delta Mn$ of the master time may be calculated based on elapsed time $(Mn-M(n-1))$ of the master time from the master time at reception of the last fixed-period signal to the master time at reception of the current fixed-period signal, or based on the transmission period P indicated by the transmission period information. The advancement $\Delta Jn$ of the slave time is calculated based on elapsed time $(Jn-M(n-1))$ of the master time elapsed from the corrected slave time at reception of the last fixed-period signal to the corrected slave time at reception of the current fixed-period signal, where n≥2. The time advancement corrector 31 corrects the time in the slave timekeeper 21 by matching the advancement $\Delta Jn$ of the slave time with the advancement $\Delta Mn$ of the master time. Thus, the slave time is corrected to the current master time every time when each slave device 2 receives a fixed-period signal, and the advancement of the slave time is corrected in accordance with the advancement of the master time.

Figure 15:
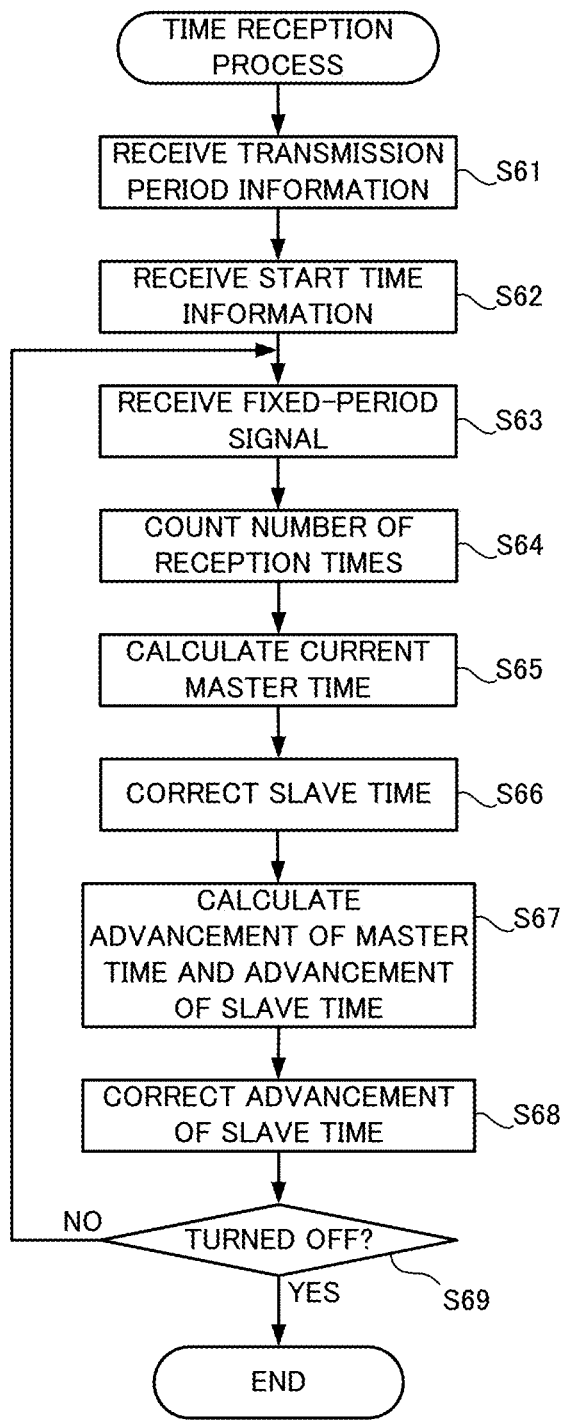
FIG. 15 is a flowchart showing a time reception process according to Embodiment 4.

The time reception process performed by each slave device 2 is described with reference to FIG. 15. The time reception process illustrated in FIG. 15 is started when the slave device 2 is turned on. Steps S61 to S66 are the same as steps S41 to S46 in the flowchart illustrated in FIG. 9, and thus are not described. The time advancement corrector 31 in the slave device 2 calculates the advancement of the master time and the advancement of the slave time based on the transmission time at which the master device 1 transmits the fixed-period signals and the time measured by the slave timekeeper 21 at which the fixed-period signal receiver 22 receives the fixed-period signal (step S67). In the example illustrated in FIG. 14, the time advancement corrector 31 calculates the advancement $\Delta Mn$ of the master time and the advancement $\Delta Jn$ of the slave time. The advancement $\Delta Mn$ of the master time may be calculated based on the elapsed time $(Mn-M(n-1))$ of the master time from the master time at reception of the last fixed-period signal to the master time at reception of the current fixed-period signal, or based on the transmission period P indicated by the transmission period information. The advancement $\Delta Jn$ of the slave time is calculated based on the elapsed time $(Jn-M(n-1))$ of the master time elapsed from the corrected slave time at reception of the last fixed-period signal to the corrected slave time at reception of the current fixed-period signal.

Referring back to FIG. 15, the time advancement corrector 31 corrects the time in the slave timekeeper 21 by matching the advancement of the slave time with the advancement of the master time (step S68). Unless the slave device 2 is turned off (NO in step S69), the processing returns to step S63 and repeats steps S63 to S69. Thus, the slave time is corrected to the current master time every time when each slave device 2 receives a fixed-period signal, and the advancement of the slave time is corrected in accordance with the advancement of the master time. When the slave device 2 is turned off (YES in step S69), the process ends.

As described above, in the time synchronization system 100 according to Embodiment 4 that performs synchronization to set the time in each slave device 2 to the time in the master device 1, the master device 1 transmits fixed-period signals to the slave devices 2 through the dedicated signal line 3, and corrects the time in the slave devices 2 to the time in the master device 1 based on the number of reception times, the transmission period, and the transmission start time of fixed-period signals. Every transmission of a fixed-period signal does not involve transmission of time information at the transmission time point through the data bus 4. Thus, a period in which a fixed-period signal is transmitted can be shortened independently of jitter and propagation delay time caused in the data bus 4, and thus more accurate synchronization can be achieved. This structure performs correction by matching the advancement of the slave time with the advancement of the master time and thus reduces the difference between the slave time and the master time.

In the embodiments described above, the slave devices 2 according to Embodiments 3 and 4 are combined with the master device 1 according to Embodiment 2, but this is not limitative. The slave devices 2 according to Embodiments 3 and 4 may be combined with the master device 1 according to Embodiment 1.

In the embodiments described above, Embodiments 3 are 4 separately described but may be combined together. Each slave device 2 includes, as functional components, a slave timekeeper 21, a fixed-period signal receiver 22, a counter 23, a start time receiver 24, a start time storage 25, a transmission period receiver 26, a transmission period storage 27, a time calculator 28, a time corrector 29, an uncorrected timekeeper 30, and a time advancement corrector 31. Every time when correction timing between the transmission periods, the time advancement corrector 31 corrects the time in the slave timekeeper 21 by matching the advancement of the slave time with the advancement of the master time.

In the embodiments described above, every time when receiving a notification of the number of times the fixed-period signal is received from the counter 23, the time calculator 28 in the slave device 2 calculates the transmission time at which the master device 1 transmits the fixed-period signals as the current master time, based on the number of times the fixed-period signal is received that is indicated by the notification from the counter 23, the start time information stored in the start time storage 25, and the transmission period information stored in the transmission period storage 27. However, the time calculator 28 may calculate the transmission time at which the master device 1 transmits the fixed-period signals as the current master time in any manner. Every multiple times (for example, two times) when receiving a notification of the number of times the fixed-period signal is received from the counter 23, the time calculator 28 may calculate the transmission time at which the master device 1 transmits the fixed-period signals as the current master time. In other words, the number of times the fixed-period signal is received per unit time may be larger than the number of times of synchronization.

Figure 16:
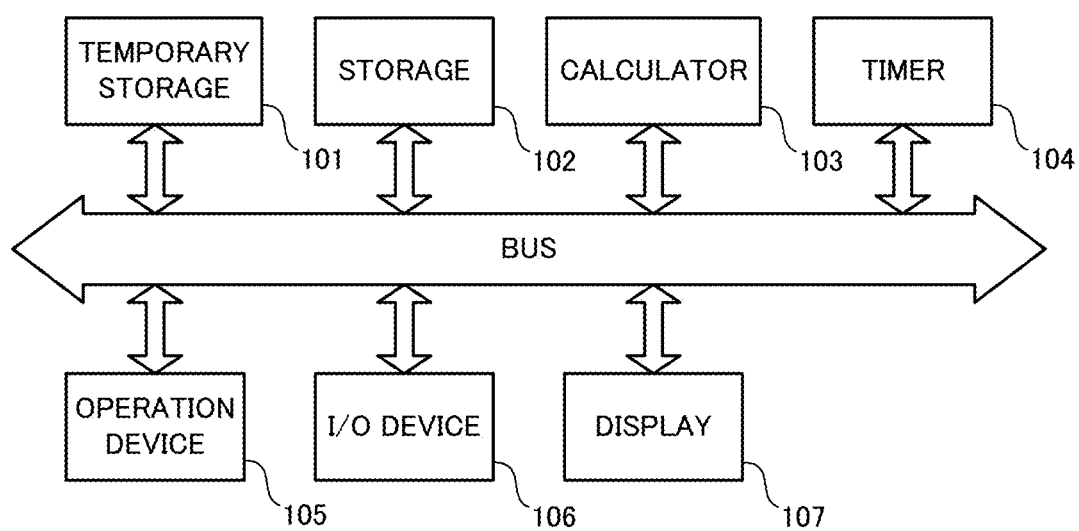
FIG. 16 is a hardware configuration diagram of a master device and a slave device according to Embodiments 1 to 4.

The hardware structure of each master device 1 and each slave device 2 according to Embodiments 1 to 4 is described. As illustrated in FIG. 16, each of the master devices 1 and the slave devices 2 includes a temporary storage 101, a storage 102, a calculator 103, a timer 104, an operation device 105, an input/output (I/O) device 106, and a display 107. The temporary storage 101, the storage 102, the timer 104, the operation device 105, the I/O device 106, and the display 107 are connected to the calculator 103 via a BUS.

The calculator 103 is, for example, a central processing unit (CPU). In accordance with control programs stored in the storage 102, the calculator 103 performs processing with the fixed-period signal transmitter 12 and the start time transmitter 13 in the master device 1, and the counter 23, the time calculator 28, the time corrector 29, and the time advancement corrector 31 in the slave device 2.

The temporary storage 101 is, for example, a random-access memory (RAM). The temporary storage 101 loads the control programs stored in the storage 102 and is used as a work area for the calculator 103.

The storage 102 is a non-volatile memory such as a flash memory, a hard disk drive, a digital versatile disc-random-access memory (DVD-RAM), and a digital versatile disc-rewritable (DVD-RW). The storage 102 stores, in advance, a program for causing the calculator 103 to perform processing on the master device 1 and the slave device 2, provides data stored in this program to the calculator 103 in accordance with an instruction from the calculator 103, and stores the data provided from the calculator 103. The transmission period storage 14 and the start time storage 16 in the master device 1, and the start time storage 25 and the transmission period storage 27 in the slave device 2 are included in the storage 102.

The timer 104 is, for example, a quartz oscillator, an oscillator circuit, or a clock-dedicated integrated circuit (IC). The timer 104 functions as the master timekeeper 11 in the master device 1 and the slave timekeeper 21 in the slave device 2.

The operation device 105 includes an input device such as a keyboard and a pointing device, and an interface that connects the input device, such as a keyboard and a pointing device, to the BUS. For example, a structure that directly inputs information into the master device 1 and the slave devices 2 provides the input information to the calculator 103 through the operation device 105.

The I/O device 106 includes a radio communication device or a network terminator connected to a network, and a local area network (LAN) interface or a serial interface connected to the communication device or the network terminator. The I/O device 106 functions as the fixed-period signal transmitter 12, the start time transmitter 13, and the transmission period transmitter 15 in the master device 1, and the fixed-period signal receiver 22, the start time receiver 24, and the transmission period receiver 26 in the slave device 2.

The display 107 is, for example, a cathode ray tube (CRT) or a liquid crystal display (LCD). For example, in a structure that directly inputs information into the master device 1 and the slave devices 2, the display 107 displays an operation screen.

The processing performed by the master timekeeper 11, the fixed-period signal transmitter 12, the start time transmitter 13, the transmission period storage 14, the transmission period transmitter 15, and the start time storage 16 in the master device 1 illustrated in FIG. 2, and the processing performed by the slave timekeeper 21, the fixed-period signal receiver 22, the counter 23, the start time receiver 24, the start time storage 25, the transmission period receiver 26, the transmission period storage 27, the time calculator 28, the time corrector 29, and the time advancement corrector 31 in the slave device 2 illustrated in FIG. 3 are performed by the control program using, for example, the temporary storage 101, the calculator 103, the storage 102, the timer 104, the operation device 105, the I/O device 106, and the display 107 as resources.

The above hardware structure and flowcharts are mere examples and may be changed or modified as appropriate.

The processing to be performed by the temporary storage 101, the storage 102, the calculator 103, the timer 104, the operation device 105, the I/O device 106, the display 107, or other components in the master device 1 and the slave device 2 can be implementable by a device other than a dedicated system, and may be implementable by a common computer system. For example, a computer program executable to implement the above operation may be stored in a non-transitory computer-readable recording medium, such as a flexible disk, a compact disc read-only memory (CD-ROM), and a digital versatile disc read-only memory (DVD-ROM), for distribution. The computer program may be installed in a computer to provide a master device 1 and a slave device 2 that perform the above processing. The computer program may be stored in a storage device in a server on a communication network, such as the Internet, and may be downloaded by a common computer system to provide a master device 1 and a slave device 2.

In the system with the functions of the master device 1 and the slave device 2 implementable partly by the operating system (OS) and application programs or through cooperation between the OS and the application programs, portions of the application programs may be simply stored in a non-transitory recording medium or a storage device.

Also, the computer program may be superimposed on a carrier wave to be provided with a communication network. For example, the above computer program may be posted on a bulletin board system (BBS) on a communication network to be provided through the communication network. The computer program may be activated and executed under the control of the OS similarly to other application programs to perform the above processing.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Master device
2, 2A, 2B, 2C Slave device
3 Signal line
4 Data bus
11 Master timekeeper
12 Fixed-period signal transmitter
13 Start time transmitter
14 Transmission period storage
15 Transmission period transmitter
16 Start time storage
21 Slave timekeeper
22 Fixed-period signal receiver
23 Counter
24 Start time receiver
25 Start time storage
26 Transmission period receiver
27 Transmission period storage
28 Time calculator
29 Time corrector
30 Uncorrected timekeeper
31 Time advancement corrector
100 Time synchronization system
101 Temporary storage
102 Storage
103 Calculator
104 Timer
105 Operation device
106 I/O device
107 Display

The invention claimed is:

1. A time synchronization system comprising:
a master device; and
a slave device,
the master device and the slave device being connected to each other via a data communication line and a signal line dedicated to transmission of a fixed-period signal,
the master device including
a master timekeeper to measure a time,
a fixed-period signal transmitter to, regularly at a transmission period, generate the fixed-period signal and transmit the fixed-period signal to the slave device through the signal line,
a start time transmitter to transmit, to the slave device through the data communication line, start time information indicating a transmission start time at which transmission of the fixed-period signal is started,
a transmission period transmitter to transmit, to the slave device through the data communication line, the transmission period information indicating the transmission period for the fixed-period signal,
the slave device including
a slave timekeeper to measure a time,
a fixed-period signal receiver to receive the fixed-period signal from the master device through the signal line,
a start time receiver to receive the start time information from the master device through the data communication line,
a transmission period receiver to receive the transmission period information from the master device through the data communication line,
a counter to count a number of times the fixed-period signal is received by the fixed-period signal receiver,
a time calculator to calculate, as a current time in the master device, a transmission time at which the master device transmits the fixed-period signal, based on the transmission start time indicated by the start time information, the transmission period indicated by the transmission period information, and the number of times the fixed-period signal is received, and
a time corrector to correct the time measured by the slave timekeeper to the current time in the master device calculated by the time calculator.

2. The time synchronization system according to claim 1, wherein
every time when the counter counts the number of times the fixed-period signal is received, the time calculator calculates, as the current time in the master device, the transmission time at which the master device transmits the fixed-period signal, based on the transmission start time indicated by the start time information, the transmission period indicated by the transmission period information, and the number of times the fixed-period signal is received.

3. The time synchronization system according to claim 1, wherein
the master device further includes a time storage to store the start time information indicating a predetermined transmission start time at which the transmission of the fixed-period signal is started,
the start time transmitter transmits the start time information stored in the time storage to the slave device through the data communication line, and
the fixed-period signal transmitter starts the transmission of the fixed-period signal when the time measured by the master timekeeper reaches the transmission start time indicated by the start time information.

4. The time synchronization system according to claim 1, wherein
the slave device further includes an uncorrected timekeeper to measure a time that is equal to the time measurable by the slave timekeeper, for which no time correction is performed by the time corrector, and the time calculator (i) calculates the transmission time at which the master device transmits the fixed-period signal, based on the transmission start time indicated by the start time information, the transmission period indicated by the transmission period information, and the number of times the fixed-period signal is received, and (ii) calculates, at time correction timing during the transmission period, the current time in the master device, based on the transmission time at which the master device transmits the fixed-period signal, a time measured by the uncorrected timekeeper at which the fixed-period signal receiver receives the fixed-period signal, and a current time measured by the uncorrected timekeeper.

5. The time synchronization system according to claim 1, further comprising:

a time advancement corrector to calculate advancement of the time measured by the slave timekeeper and advancement of the time measured by the master timekeeper based on the transmission time at which the master device transmits the fixed-period signal and a time measured by the slave timekeeper at which the fixed-period signal receiver receives the fixed-period signal, and to perform correction for matching the advancement of the time measured by the slave timekeeper with the advancement of the time measured by the master timekeeper.

6. The time synchronization system according to claim 1, wherein the time calculator adds, to the transmission start time indicated by the start time information, time obtained by multiplying the transmission period indicated by the transmission period information by a value obtained by subtracting 1 from the number of times the fixed-period signal is received, thereby calculating the transmission time at which the master device transmits the fixed-period signal.

7. A master device connected to a slave device via a data communication line and a signal line dedicated to transmission of a fixed-period signal, the master device comprising:

a master timekeeper to measure a time;

a fixed-period signal transmitter to, regularly at a transmission period, generate the fixed-period signal and transmit the fixed-period signal to the slave device through the signal line;

a start time transmitter to transmit, to the slave device through the data communication line, start time information indicating a transmission start time at which transmission of the fixed-period signal is started;

a transmission period transmitter to transmit, to the slave device through the data communication line, the transmission period information indicating the transmission period for the fixed-period signal.

8. A slave device connected to a master device via a data communication line and a signal line dedicated to transmission of a fixed-period signal, the slave device comprising:

a slave timekeeper to measure a time;

a fixed-period signal receiver to receive the fixed-period signal transmitted regularly at a transmission period from the master device through the signal line;

a start time receiver to receive, from the master device through the data communication line, start time information indicating a transmission start time at which transmission of the fixed-period signal is started;

a transmission period receiver to receive, from the master device through the data communication line, transmission period information indicating the transmission period for the fixed-period signal;

a counter to count a number of times the fixed-period signal is received by the fixed-period signal receiver;

a time calculator to calculate, as a current time in the master device, a transmission time at which the master device transmits the fixed-period signal, based on the transmission start time indicated by the start time information, the transmission period indicated by the transmission period information, and the number of times the fixed-period signal is received; and a time corrector to correct the time measured by the slave timekeeper to the current time in the master device calculated by the time calculator.

9. The slave device according to claim 8, wherein the time calculator calculates, as the current time in the master device, the transmission time at which the master device transmits the fixed-period signal obtained by adding, to the transmission start time indicated by the start time information, time obtained by multiplying the transmission period indicated by the transmission period information by a value obtained by subtracting 1 from the number of times the fixed-period signal is received.

10. A non-transitory computer readable recording medium storing a program for causing a computer connected to a slave device via a data communication line and a signal line dedicated to transmission of a fixed-period signal to function as:

a master timekeeper to measure a time;

a fixed-period signal transmitter to generate, regularly at a transmission period, the fixed-period signal and transmit the fixed-period signal to the slave device through the signal line;

a start time transmitter to transmit, to the slave device through the data communication line, start time information indicating a transmission start time at which transmission of the fixed-period signal is started; and a transmission period transmitter to transmit, to the slave device through the data communication line, transmission period information indicating the transmission period for the fixed-period signal.

11. A non-transitory computer readable recording medium storing a program for causing a computer connected to a master device via a data communication line and a signal line dedicated to transmission of a fixed-period signal to function as:

a slave timekeeper to measure a time;

a fixed-period signal receiver to receive the fixed-period signal transmitted regularly at a transmission period from the master device through the signal line;

a start time receiver to receive, from the master device through the data communication line, start time information indicating a transmission start time at which transmission of the fixed-period signal is started;

a transmission period receiver to receive, from the master device through the data communication line, transmission period information indicating the transmission period for the fixed-period signal;

a counter to count a number of times the fixed-period signal is received by the fixed-period signal receiver;

a time calculator to calculate, as a current time in the master device, a transmission time at which the master device transmits the fixed-period signal, based on the transmission start time indicated by the start time information, the transmission period indicated by the transmission period information, and the number of times the fixed-period signal is received; and a time corrector to correct the time measured by the slave timekeeper to the current time in the master device calculated by the time calculator.

12. The non-transitory computer readable recording medium according to claim 11, wherein the time calculator calculates, as the current time in the master device, the transmission time at which the master device transmits the fixed-period signal obtained by adding, to the transmission start time indicated by the start time information, time obtained by multiplying the transmission period indicated by the transmission period information by a value obtained by subtracting 1 from the number of times the fixed-period signal is received.

13. The time synchronization system according to claim 2, wherein the master device further includes a time storage to store the start time information indicating a predetermined transmission start time at which the transmission of the fixed-period signal is started, the start time transmitter transmits the start time information stored in the time storage to the slave device through the data communication line, and the fixed-period signal transmitter starts the transmission of the fixed-period signal when the time measured by the master timekeeper reaches the transmission start time indicated by the start time information.

14. The time synchronization system according to claim 2, wherein the slave device further includes an uncorrected timekeeper to measure a time that is equal to the time measurable by the slave timekeeper, for which no time correction is performed by the time corrector, and the time calculator (i) calculates the transmission time at which the master device transmits the fixed-period signal, based on the transmission start time indicated by the start time information, the transmission period indicated by the transmission period information, and the number of times the fixed-period signal is received, and (ii) calculates, at time correction timing during the transmission period, the current time in the master device, based on the transmission time at which the master device transmits the fixed-period signal, a time measured by the uncorrected timekeeper at which the fixed-period signal receiver receives the fixed-period signal, and a current time measured by the uncorrected timekeeper.

15. The time synchronization system according to claim 3, wherein the slave device further includes an uncorrected timekeeper to measure a time that is equal to the time measurable by the slave timekeeper, for which no time correction is performed by the time corrector, and the time calculator (i) calculates the transmission time at which the master device transmits the fixed-period signal, based on the transmission start time indicated by the start time information, the transmission period indicated by the transmission period information, and the number of times the fixed-period signal is received, and (ii) calculates, at time correction timing during the transmission period, the current time in the master device, based on the transmission time at which the master device transmits the fixed-period signal, a time measured by the uncorrected timekeeper at which the fixed-period signal receiver receives the fixed-period signal, and a current time measured by the uncorrected timekeeper.

16. The time synchronization system according to claim 2, further comprising:

a time advancement corrector to calculate advancement of the time measured by the slave timekeeper and advancement of the time measured by the master timekeeper based on the transmission time at which the master device transmits the fixed-period signal and a time measured by the slave timekeeper at which the fixed-period signal receiver receives the fixed-period signal, and to perform correction for matching the advancement of the time measured by the slave timekeeper with the advancement of the time measured by the master timekeeper.

17. The time synchronization system according to claim 3, further comprising:

a time advancement corrector to calculate advancement of the time measured by the slave timekeeper and advancement of the time measured by the master timekeeper based on the transmission time at which the master device transmits the fixed-period signal and a time measured by the slave timekeeper at which the fixed-period signal receiver receives the fixed-period signal, and to perform correction for matching the advancement of the time measured by the slave timekeeper with the advancement of the time measured by the master timekeeper.

18. The time synchronization system according to claim 4, further comprising:

a time advancement corrector to calculate advancement of the time measured by the slave timekeeper and advancement of the time measured by the master timekeeper based on the transmission time at which the master device transmits the fixed-period signal and a time measured by the slave timekeeper at which the fixed-period signal receiver receives the fixed-period signal, and to perform correction for matching the advancement of the time measured by the slave timekeeper with the advancement of the time measured by the master timekeeper.

19. The time synchronization system according to claim 2, wherein the time calculator adds, to the transmission start time indicated by the start time information, time obtained by multiplying the transmission period indicated by the transmission period information by a value obtained by subtracting 1 from the number of times the fixed-period signal is received, thereby calculating the transmission time at which the master device transmits the fixed-period signal.

20. The time synchronization system according to claim 3, wherein the time calculator adds, to the transmission start time indicated by the start time information, time obtained by multiplying the transmission period indicated by the transmission period information by a value obtained by subtracting 1 from the number of times the fixed-period signal is received, thereby calculating the transmission time at which the master device transmits the fixed-period signal.

* * * * *